United States Patent
An et al.

(10) Patent No.: US 7,304,979 B2
(45) Date of Patent: Dec. 4, 2007

(54) OVERHEAD MESSAGE AND CHANNEL HASHING METHOD USING THE SAME

(75) Inventors: Jong Hoe An, Gyeonggi-do (KR); Chan Ho Kyung, Incheon (KR); Young Jo Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 910 days.

(21) Appl. No.: 10/635,783

(22) Filed: Aug. 5, 2003

(65) Prior Publication Data

US 2004/0057413 A1 Mar. 25, 2004

(30) Foreign Application Priority Data

Aug. 20, 2002 (KR) .................. 10-2002-0049242

(51) Int. Cl.
*H04J 3/24* (2006.01)
*H04B 7/216* (2006.01)

(52) U.S. Cl. .................. 370/349; 370/342; 370/235

(58) Field of Classification Search ............... 370/235, 370/342, 320, 441, 335, 345, 349, 389, 395.21, 370/312
See application file for complete search history.

(56) References Cited

U.S. PATENT DOCUMENTS 5,768,267 A * 6/1998 Raith et al. .................. 370/329
6,381,235 B1 * 4/2002 Kamel et al. ................ 370/342
6,952,583 B1 * 10/2005 Park et al. ................... 455/434
2002/0141371 A1 * 10/2002 Hsu ............................ 370/338
2003/0161283 A1 * 8/2003 Tiedemann et al. ......... 370/329
2003/0174674 A1 * 9/2003 Lee et al. .................... 370/331
2004/0266445 A1 * 12/2004 Burgess et al. ............. 455/450
2006/0246885 A1 * 11/2006 Lee ............................. 455/421

* cited by examiner

*Primary Examiner*—Sonny Trinh
(74) *Attorney, Agent, or Firm*—Lee, Hong, Degerman, Kang & Schmadeka

(57) ABSTRACT

An overhead message and a method of performing channel hashing using the same are provided. The overhead message includes first and second fields of an extended CDMA channel list message (ECCLM). The first field contains information indicating whether the ECCLM includes at least one frequency assignment of list of frequency assignments that allows packet data support for a forward packet data channel or a 1×EV-DV system and the second field indicates whether each frequency assignment allows such support, thereby enabling channel hashing to be performed by a packet-data-supportable mobile station of a communication system.

29 Claims, 2 Drawing Sheets

OVERHEAD MESSAGE AND CHANNEL HASHING METHOD USING THE SAME

This application claims the benefit of Korean Application No. 10-2002-0049242 filed on Aug. 20, 2002, which is hereby incorporated by reference.

BACKGROUND OF THE INVENTION

1. Field of the Invention

The present invention relates to mobile communication systems and code division multiple access (CDMA) technology, and more particularly, to an overhead message and a channel hashing method using the same, in which new fields are assigned for channel hashing.

2. Discussion of the Related Art

The base stations of a mobile communication system typically support a plurality of frequency assignments. To inform a mobile station (e.g., cellular telephone) of the supportable frequency assignments, a base station generates and sends to the mobile station a CDMA channel list message (CCLM) or an extended CDMA channel list message (ECCLM), both of which are types of overhead messages sent out over a forward paging channel or a forward broadcast control channel. An overhead message is a message sent by a base station to all mobile stations, to establish system operating parameters by communicating information that may be specific to the base station or may be common to the entire system.

Generally speaking, only one or the other of the CCLM and ECCLM is received by a mobile station at any given time, since IS-95A and IS-95B systems send out a CCLM while IS-2000 systems send out an ECCLM. Thus, the CCLM normally applies where the ECCLM is unavailable.

The CCLM or ECCLM contains a frequency assignment list (or CDMA channel list) of all supportable frequency assignments for the receiving mobile station. Based on the received information on the frequency assignments, as well as data extracted from its own telephone number, the mobile station selects one service frequency assignment among the list. The process of determining one frequency assignment for selection and service is called "channel hashing."

A channel hashing method according to a related art will be explained with reference to FIG. 1, wherein a mobile station receives an overhead message via a forward paging channel (F-PCH).

In a step 101, when a mobile station is powered up (turned on) or its system status is changed, the mobile station first selects an internal system for operation, namely, a CDMA or analog system. In doing so, the mobile station performs a call processing preparation procedure using a primary channel of the selected internal system, and if the primary channel fails, a secondary channel is used. Subsequently, the mobile station sequentially performs operations for acquiring first a pilot channel and then a synchronization channel.

The synchronization channel carries system information and timing information, for creating a system parameter message (SPM), which is an overhead message sent out by a base station and includes a CDMA_FREQ field. In specially supported systems (described later), the SPM may include an EXT_CDMA_FREQ field in addition to a CDMA_FREQ field. Thus, when transferring an overhead message, the system information indicates the availability of a primary paging channel in a prescribed frequency assignment.

If the mobile station fails to acquire either a pilot channel or a synchronization channel, the processes of the step S101 are performed anew, starting from system selection. The next step is performed only upon acquisition of the pilot and synchronization channels, and in particular, the system and timing information of the synchronization channel, which are necessary to determine a frequency assignment for a primary paging channel.

In a step S102, the mobile station receives the SPM, which includes the frequency assignment for the primary paging channel. That is, the mobile station first receives, via the synchronization channel, frequency assignment (FA) information from the base station. The FA information thus informs the mobile station of the primary paging channel, so that the mobile station may tune to the assigned frequency of the primary paging channel and thereby receive the SPM. The received SPM contains information on the transmission of an overhead message (e.g., the CCLM or ECCLM), indicating transmission through a corresponding paging channel or broadcast control channel.

A step 103 determines whether the SPM indicates the transmission of an ECCLM or a CCLM. The mobile station will use the FA information (CDMA channel list) included in the ECCLM or CCLM to select a service frequency assignment and thus perform channel hashing. Accordingly, the mobile station will receive either the CCLM in a step S104 or the ECCLM in a step S105.

Referring to a step S106, where the FA information of the ECCLM has been received and is to be used for channel hashing, the mobile station determines whether the system, i.e., the base station and the mobile station, has special system support which includes support for a quick paging channel (QPCH) or capability of a radio configuration beyond RC2 (>RC2). If the above special system support is provided, the mobile station selects in a step S107 a CDMA channel (service frequency assignment) from a subset of channels among the frequency assignment list included in the ECCLM. Here, the subset of channels includes only those channels that provide support for quick paging or a radio configuration beyond RC2. On the other hand, if the mobile station uses the FA information of a CCLM for the channel hashing, or if despite receiving an ECCLM, there is no special system support as above, the mobile station selects in a step S108 the service frequency assignment from the entire frequency assignment list included in the CCLM or ECCLM.

Accordingly, in channel hashing as above, the mobile station uses the information of the CCLM or ECCLM to select a service frequency assignment from the entire CDMA channel list such that, in the case of an ECCLM, one frequency assignment is selected from a predetermined subset. Such channel hashing in a 1×EV-DV (1×evolution—data and voice) system, however, is based on a random selection from the entire frequency assignment list, even when an ECCLM is sent, so that the selected frequency assignment may provide no 1×EV-DV support. Furthermore, a forward packet data channel (F-PDCH) cannot be assigned to a mobile station of the 1×EV-DV system. Therefore, the channel hashing method according to the related art is a hindrance to the development and proliferation of packet data supportable systems.

SUMMARY OF THE INVENTION

Accordingly, the present invention is directed to an overhead message, and a channel hashing method using the same, that substantially obviate one or more of the problems due to limitations and disadvantages of the related art.

An object of the present invention is to provide a new overhead message, having new fields, for channel hashing.

Another object of the present invention is to provide a method enabling reliable channel hashing in a communication system.

A further object of the present invention is to provide a method of performing channel hashing in a communication system, which enables a forward packet data channel to be freely assigned to a mobile station of a 1×EV-DV system.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of performing channel hashing in a communication system, the method comprising a step of transmitting an overhead message including a list of frequency assignments to at least one receiving side through a common channel. The overhead message includes a first field, the first field containing information indicating whether the frequency assignment list includes at least one frequency assignment allowing packet data support. Conditionally, the overhead message also includes a second field, the second field containing information indicating whether each frequency assignment in the frequency assignment list allows packet data support In another aspect of the present invention, there is provided a method of performing channel hashing in a communication system. The method comprises steps of receiving through a common channel an overhead message including a CDMA channel list containing a plurality of frequency assignments; reading first and second fields of the received overhead message, the first field containing information indicating whether at least one frequency assignment allowing packet data support is included in the plurality of frequency assignments and the second field containing information indicating whether each frequency assignment of the plurality of frequency assignments allows packet data support; formulating a first subset of channels based on the information of the first and second fields of the received overhead message; and choosing as a service channel one of the selected frequency assignments of the first subset of channels In another aspect of the present invention, there is provided a method of performing channel hashing in a communication system. The method comprises steps of receiving an overhead message, sent through a forward common channel from a base station to a mobile station, the overhead message including at least one field and a CDMA channel list; determining in the mobile station whether the base station and mobile station both provide packet data support, based on the at least one field of the received overhead message; formulating a first subset of channels according to a result of the determining step; and randomly selecting one frequency assignment from the first subset of channels.

According to the present invention, a communication system adopting the method of the present invention may support either a forward packet data channel (F-PDCH) or a "1×evolution—data and voice" system, commonly known as a 1×EV-DV system, for both voice and packet data. Thus, throughout the following description, a reference to packet data support denotes support for a packet data channel or a 1×EV-DV system or support for equivalent means of packet data transmission and reception in a communication system.

In the following description, special system support is specifically limited to systems that support quick paging and/or are capable of radio configurations beyond RC2. The radio configuration (RC) defines the data rate, error detection code, code rate, and the like for each channel in an IS-2000 system. Communication resources such as supportable data rate and available frequency band typically improve for radio configurations having a higher RC number, which increment as services are improved and the corresponding mobile stations are supported. Thus, a radio configuration beyond RC2, or >RS2, is any one of RC3 through RC9, where RC1 and RC2 are for IS-95A and IS-95B systems and RC3 to RC9 are for the high transport rates of CDMA 2000 1x and CDMA 2000 3x systems.

In addition, a frequency assignment list is, for example, a list of CDMA channels supported by the communication system, e.g., a base station (BS). Thus, a selected frequency assignment is the service frequency of the CDMA channel selected for use by the communication system, e.g., a mobile station (MS).

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate an embodiment of the invention and together with the description serve to explain the principle of the invention. In the drawings.

DETAILED DESCRIPTION OF THE PREFERRED EMBODIMENT

Figure 1:
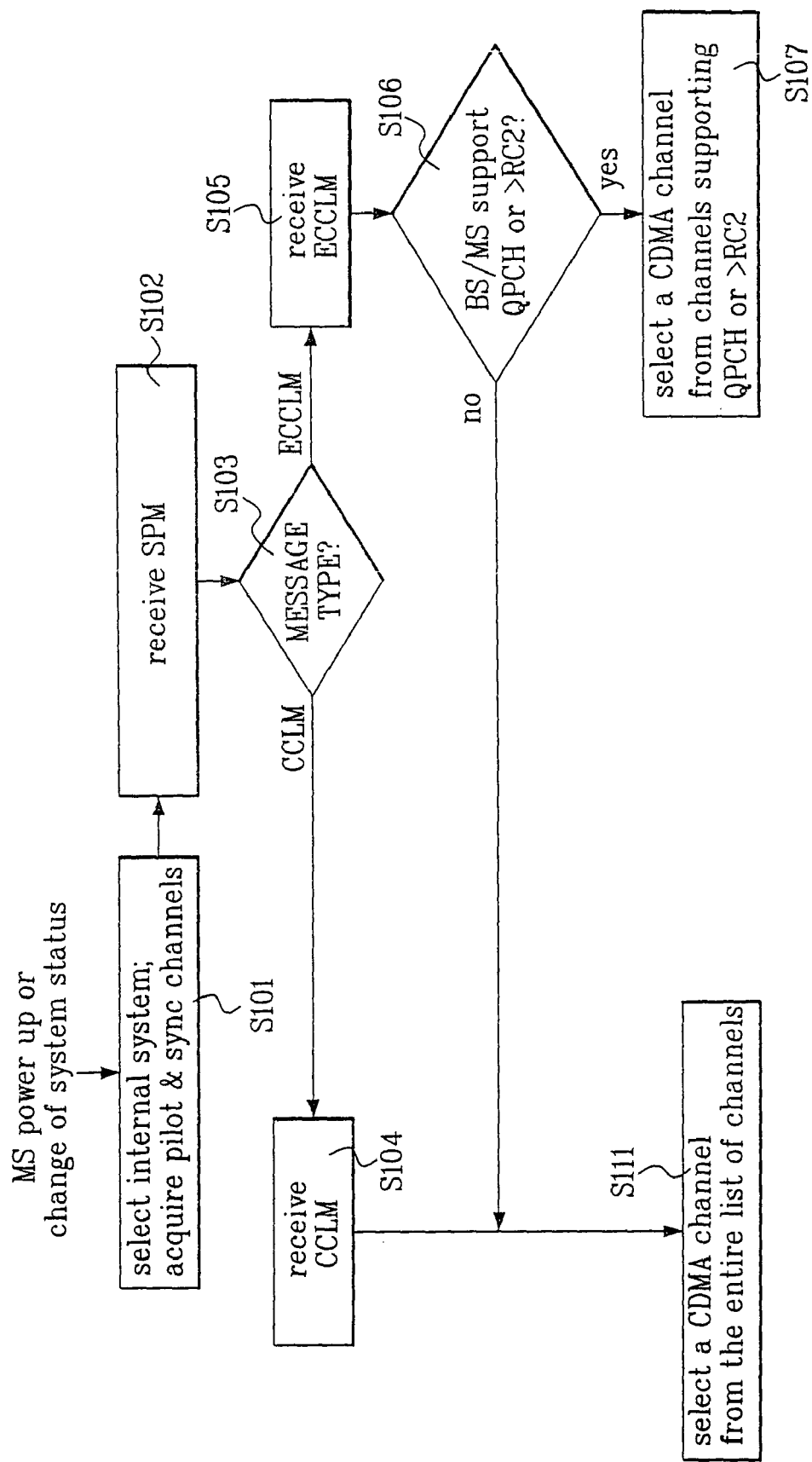
FIG. 1 is a flowchart illustrating a method of performing channel hashing in a communication system according to a related art.

Reference will now be made in detail to the preferred embodiment of the present invention, an example of which is illustrated in the accompanying drawings. Throughout the drawings, where possible, like elements are indicated using the same or similar reference designations.

An overhead message according to the present invention includes first and second fields, each containing specific information regarding packet data support for a forward packet data channel (F-PDCH) or a 1×evolution—data and voice (1×EV-DV) system, which is a system that simultaneously supports both voice and packet data. Support is determined according to a frequency assignment list (or CDMA channel list) included in an extended CDMA channel list message (ECCLM). The information of the first field indicates whether packet data support is enabled for at least one frequency assignment, and the information of the second field indicates whether packet data support is enabled for each frequency assignment. These fields are incorporated into the architecture of an ECCLM.

TABLE 1

ECCLM architecture

| field nomenclature | field length | remarks |
|---|---|---|
| NUM_FREQ | 4 bits | equal to number of occurrences of CDMA_FREQ |
| CDMA_FREQ | 11 bits | include NUM_FREQ occurrences of this field |
| RC_QPCH_SEL_INCL | 1 bit | if this field value is "1," include NUM_FREQ occurrences of next field |
| RC_QPCH_HASH_IND | 1 bit | (omitted if the above field is "0") |
| . | | |
| . | | |
| . | | |
| PDCH_SEL_INCL | 1 bit | if this field value is "1," include NUM_FREQ occurrences of next field |
| PDCH_HASH_IND | 1 bit | (omitted if the above field value is "0") |
| . | | |
| . | | |
| . | | |

Table 1 illustrates the relevant portion of an ECCLM according to an embodiment of the present invention. The ECCLM is an overhead message sent out from a base station, to all mobile stations, on a forward CDMA channel such as a paging channel or a broadcast control channel.

In the above Table, the fields are assigned in accordance with the embodiment of the present invention. The NUM_FREQ field indicates the total count of frequency assignments of a frequency assignment list, as supported by the base station, and has a length of four bits; the CDMA_FREQ field indicates the value of each frequency assignment and has a length of eleven bits; the RC_QPCH_SEL_INCL field indicates whether the ECCLM contains at least one frequency assignment providing special system support, i.e., system support for quick paging or a radio configuration beyond RC2, and is represented by one bit; the RC_QPCH_HASH_IND field indicates whether each of the frequency assignments provides the above special system support; the PDCH_SEL_INCL field indicates to one or more corresponding mobile stations whether the base station includes at least one frequency assignment allowing packet data support and is represented by one bit; and the PDCH_HASH_IND field indicates whether each frequency assignment of the frequency assignment list allows packet data support and is represented by one bit.

If the ECCLM includes at least one frequency assignment allowing packet data support, the base station sets to "1" the value of the PDCH_SEL_INCL field, which is otherwise set to "0," i.e., if the ECCLM includes no frequency assignments allowing packet data support. For a PDCH_SEL_INCL field value of "1," the base station includes the PDCH_HASH_IND field in the ECCLM, to indicate packet data support according to each frequency assignment of the frequency assignment list of the base station. Namely, the base station sets the PDCH_HASH_IND field to a value of "1" for each frequency assignment that allows packet data support and to a value of "0" for each frequency assignment that does not allow pack data support. A count of PDCH_HASH_IND fields corresponds to the total number of frequency assignments supported by the base station.

According to the method of the present invention, a base station may send an ECCLM to inform a mobile station as to packet data support according to the frequency assignments of the frequency assignment list. Thus, for channel hashing, the base station adopting the method of the present invention enables 1×EV-DV supportable mobile stations to select, from the entire frequency assignment list (CDMA channel list) included in the ECCLM, one service frequency assignment supporting the F-PDCH or 1×EV-DV system, while a service frequency is randomly assigned in mobile stations without 1×EV-DV support.

Figure 2:
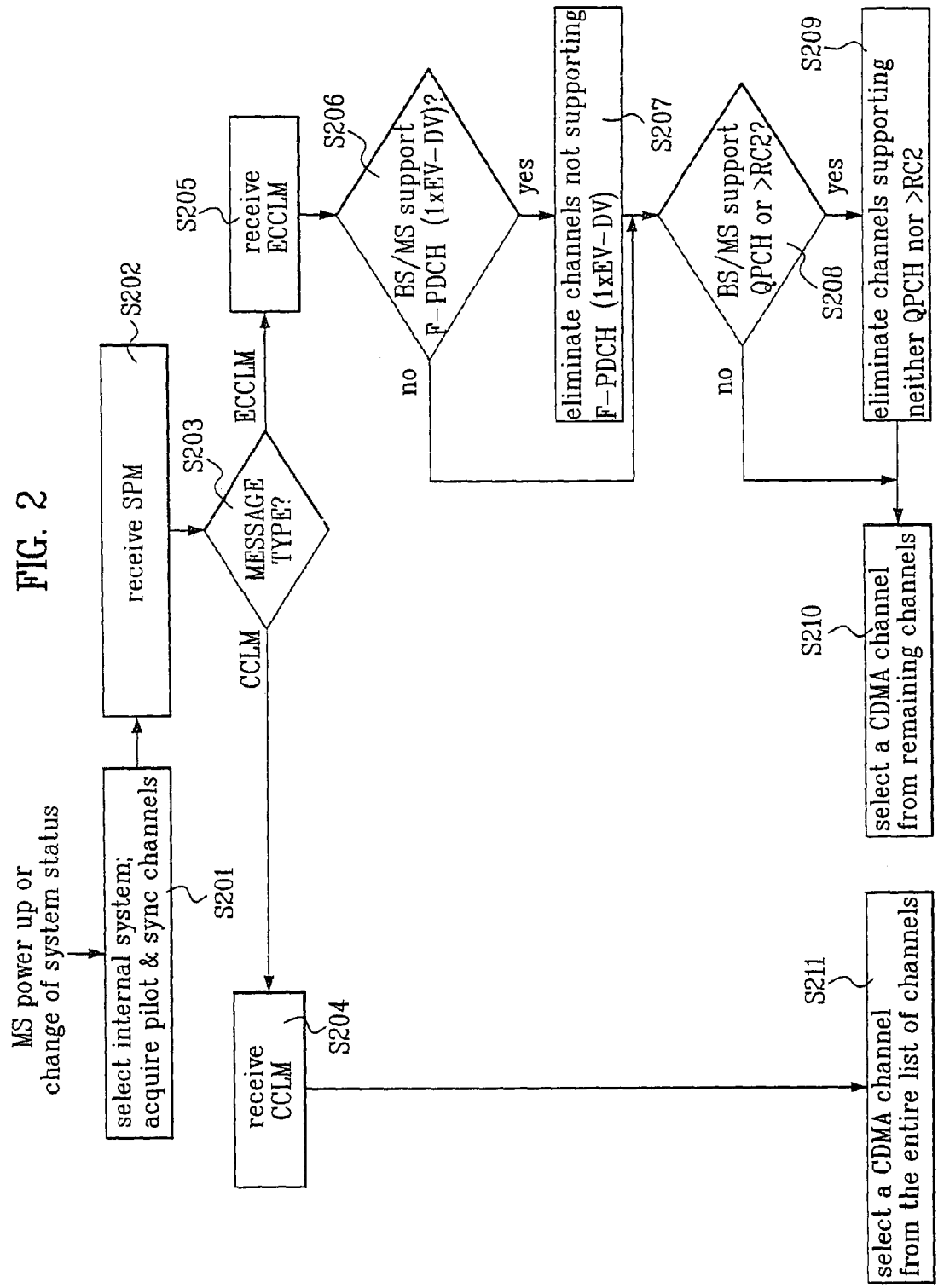
FIG. 2 is a flowchart illustrating a method of performing channel hashing in a communication system according to the present invention.

FIG. 2 is a flowchart illustrating a method of performing channel hashing in a communication system (e.g., a base station or a mobile station) according to one embodiment of the present invention. Here, an overhead message like the ECCLM of Table 1 is received by a mobile station via a forward common channel, i.e., a forward paging channel or a forward broadcast control channel, to enable channel hashing using fields as exemplified in the Table. In the method of FIG. 2, each of steps S201-S205 & S211 corresponds directly to the steps S101-S105 & S111 of FIG. 1. Thus, referring to the steps S203-S205, it is determined whether the SPM indicates the transmission of an ECCLM or a CCLM, whereby the mobile station will use the FA information (the CDMA channel list) included in the ECCLM or CCLM to select a service frequency assignment and thus perform channel hashing, by receiving either the CCLM or the ECCLM.

In a step S206, where the FA information of the ECCLM is to be used for channel hashing, the mobile station determines whether the base station and mobile station both allow packet data support. In this case, the mobile station is informed whether the base station allows packet data support by the value setting of the PDCH_SEL_INCL field. If this value is set to "1," the mobile station determines that the communication system, namely, the base station, provides packet data support and that the ECCLM includes at least one frequency assignment allowing such support, and otherwise (i.e., if "0") determines that the base station does not provide packet data support and that the ECCL contains no frequency assignment allowing such support.

If the base station and mobile station both provide packet data support, the mobile station selects in a step S207 frequency assignments for channel hashing from a first subset, by eliminating from the frequency assignment list any frequency assignment not allowing pack data support (as determined by the step S206). If either the base station or mobile station does not provide packet data support, there is no first subset and all of the frequency assignments included in the ECCLM are candidates for channel hashing.

Once the frequency assignments of the first subset are selected, it is determined within the mobile station, in a step S208, whether the base station and mobile station both provide the above-described special system support. If so, the mobile station eliminates in a step S209 any frequency that does not provide such special system support from the frequency assignments of the subset remaining after completion of the step S207, to perform channel hashing based on the remainder of the frequency assignments, i.e., those of a final subset. The final subset (by the step S209), however, may be the same as the first subset (by the step 207). That is, if either the base station or mobile station does not provide the special system support, the frequency assignment or assignments of the first subset become those of the "final" subset, and the frequency assignment is selected from the entire list of CDMA channels. Thus, through the steps S206-S209, the mobile station selects one frequency assignment from the frequency assignments of the final subset.

In the method of FIG. 2, it should be appreciated that the steps for producing the first subset and the steps for producing the final subset may be sequentially interchanged. That is, a subset selection based on whether the base station and mobile station provide packet data support in a forward packet data channel or a 1xEV-DV system, i.e., based on the steps S206 and S207, may be preformed before or after a subset selection based on whether there is special system support for quick paging or a radio configuration beyond RC2, i.e., based on the steps S208 and S209.

Accordingly, in the method of performing channel hashing according to the embodiment of the present invention, an ECCLM transmitted on a forward common channel is provided with two new fields: one field containing information indicating whether at least one frequency assignment is suitable for a F-PDCH or 1xEV-DV system, i.e., a packet data supportable system, and if so, another field containing information to indicate to a mobile station as to whether each frequency assignment allows the above packet data support, is supportable by each frequency assignment. Therefore, the present invention enables a mobile station providing packet data support to select a frequency assignment allowing packet data support.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

What is claimed is:

1. A method of performing channel hashing in a communication system, the method comprising steps of:
   receiving through a common channel an overhead message including a CDMA channel list containing a plurality of frequency assignments;
   reading first and second fields of the received overhead message, the first field containing information indicating whether at least one frequency assignment allowing packet data support is included in the plurality of frequency assignments and the second field containing information indicating whether each frequency assignment of the plurality of frequency assignments allows packet data support;
   formulating a first subset of channels based on the information of the first and second fields of the received overhead message; and
   choosing as a service channel a frequency assignment of the first subset of channels.

2. The method of claim 1, wherein the common channel is a forward common channel.

3. The method of claim 2, wherein the forward common channel is one selected from the group consisting of a forward paging channel and a forward broadcast control channel.

4. The method of claim 1, wherein the overhead message is an extended CDMA channel list message.

5. The method of claim 1, wherein the first subset of channels is formulated by removing from the CDMA channel list all frequency assignments that do not allow packet data support, when the information of the first and second fields indicates packet data support.

6. The method of claim 5, further comprising the steps of:
   determining whether a base station and a mobile station both provide special system support;
   formulating a final subset of channels by removing from the first subset of channels all frequency assignments that do not allow the special system support, if it is determined that the base station and mobile station both provide the special system support; and
   randomly selecting one service frequency assignment from the frequency assignments of the final subset of channels.

7. The method of claim 5, further comprising the steps of:
   determining whether a base station and a mobile station both provide special system support; and
   randomly selecting one service frequency assignment from the frequency assignments of the first subset of channels, if it determined that one of the base station and the mobile station does not provide the special system support.

8. The method of claim 1, further comprising the steps of:
   determining whether a base station and a mobile station both provide special system support, if the information of the first and second fields indicates no packet data support; and
   randomly selecting one service frequency assignment from the frequency assignments of the first subset of channels,
   wherein the first subset of channels is formulated by removing from the frequency assignment list all frequency assignments that do not provide the special system support, if it is determined that the base station and mobile station both provide the special system support.

9. The method of claim 1, further comprising the steps of:
   determining whether a base station and a mobile station both provide special system support, if the information of the first and second fields indicates no packet data support; and
   randomly selecting one service frequency assignment from the frequency assignment list, if it is determined that one of the base station and the mobile station does not provide the special system support.

10. The method of claim 1, wherein the communication system is a mobile station.

11. A method of performing channel hashing in a communication system, the method comprising steps of:
    receiving an overhead message, sent through a forward common channel from a base station to a mobile station, the overhead message including at least one field and a CDMA channel list;
    determining in the mobile station whether the base station and mobile station both provide packet data support, based on the at least one field of the received overhead message;
    formulating a first subset of channels according to a result of said determining step; and
    randomly selecting one frequency assignment from the first subset of channels.

12. The method of claim 11, wherein the overhead message is an extended CDMA channel list message.

13. The method of claim 11, wherein the first subset of channels is formulated by removing from the CDMA channel list all frequency assignments that do not allow packet data support, if the base station and mobile station are both determined to provide packet data support.

14. The method of claim 13, further comprising the steps of:
    determining in the mobile station whether the base station and mobile station both provide special system support;
    formulating a final subset of channels by removing from the first subset of channels all frequency assignments that do not provide the special system support, if it is determined that the base station and mobile station both provide the special system support; and randomly selecting one service frequency assignment from the final subset of channels.

15. The method of claim 14, wherein the final subset of channels is formulated by selecting the selected frequency assignments of the first subset of channels if it is determined that one of the base station and mobile station does not provide the special system support.

16. The method of claim 11, wherein the at least one field of the received overhead message includes at least one of a PDCH_SEL_INCL field having information indicating whether at least one frequency assignment allowing packet data support is included in the received overhead message and a PDCH_HASH_IND field having information indicating whether each frequency assignment of the CDMA channel list allows packet data support.

17. The method of claim 16, wherein the PDCH_SEL_INCL field and the PDCH_HASH_IND field each have a length of one bit.

18. The method of claim 17, wherein, if the PDCH_SEL_INCL field is set to a first binary value, the mobile station determines that the base station provides packet data support and that the overhead message includes the at least one frequency assignment allowing packet data support and wherein, if the PDCH_SEL_INCL field is set to a second binary value, the mobile station determines that the base station does not provide packet data support and that the overhead message does not include the at least one frequency assignment allowing packet data support.

19. The method of claim 11, further comprising steps of:
determining in the mobile station whether the base station and mobile station both provide special system support, if it is determined that one of the base station and mobile station does not support the packet data channel;
formulating a final subset of channels by removing from the first subset of channels all frequency assignments that do not provide special system support, if the base station and mobile station both provide the special system support; and
choosing as a service channel a frequency assignment of the final subset of channels.

20. The method of claim 11, further comprising the steps of:
determining in the mobile station whether the base station and mobile station both provide special system support, if it is determined that one of the base station and mobile station does not provide packet data support; and
randomly selecting one service frequency assignment from the CDMA channel list, if it is determined that one of the base station and mobile station does not provide the special system support.

21. The method of claim 11, wherein the forward common channel is one selected from the group consisting of a forward paging channel and a forward broadcast control channel.

22. An overhead message comprising:
a first field containing information indicating whether a list of frequency assignments includes at least one frequency assignment allowing packet data support; and
a second field containing information indicating whether each frequency assignment of the frequency assignment list allows packet data support, wherein the first field is a PDCH_SEL_INCL field and the second field is a PDCH_HASH_IND field, wherein the PDCH_SEL_INCL field and the PDCH_HASH_IND field each have a length of one bit, and wherein the PDCH_SEL_INCL field is set to a first binary value, if the frequency assignment list includes at least one frequency assignment allowing packet data support, and is otherwise set to a second binary value.

23. The overhead message of claim 22, wherein the PDCH_HASH_IND field is set to a first binary value, if there is at least one frequency assignment allowing packet data support, and is otherwise set to a second binary value.

24. The overhead message of claim 22, further comprising:
a third field containing information indicating whether the at least one frequency assignment in the frequency assignment list provides special system support; and
a fourth field containing information indicating whether the each frequency assignment of the frequency assignment list provides the special system support.

25. The overhead message of claim 24, wherein the third field is an RC_QPCH_SEL_INCL field and the fourth field is an RC_QPCH_HASH_IND field.

26. The overhead message of claim 25, wherein the RC_QPCH_SEL_INCL field and the RC_QPCH_HASH_IND field each have a length of one bit.

27. The overhead message of claim 26, wherein the RC_QPCH_SEL_INCL field is set to a first binary value, if the at least one frequency assignment provides the special system support, and is otherwise set to a second binary value.

28. The overhead message of claim 26, wherein the RC_QPCH_HASH_IND field is set to a first binary value, if the each frequency assignment of the frequency assignment list provides the special system support, and is otherwise set to a second binary value.

29. The overhead message of claim 22, wherein the overhead message is an extended CDMA channel list message.

* * * * *